United States Patent
Sarkis et al.

(10) Patent No.: US 11,606,740 B2
(45) Date of Patent: Mar. 14, 2023

(54) RESERVING RESOURCES FOR SUBSEQUENT SIDELINK TRANSMISSIONS VIA AN INITIAL SIDELINK CONTROL INFORMATION COMMUNICATION

(71) Applicant: QUALCOMM Incorporated, San Diego, CA (US)

(72) Inventors: Gabi Sarkis, San Diego, CA (US); Alexandros Manolakos, San Diego, CA (US); Sudhir Kumar Baghel, Hillsborough, NJ (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/950,784

(22) Filed: Nov. 17, 2020

(65) Prior Publication Data

US 2021/0153102 A1    May 20, 2021

Related U.S. Application Data

(60) Provisional application No. 62/937,194, filed on Nov. 18, 2019.

(51) Int. Cl.
  *H04W 48/02*   (2009.01)
  *H04W 28/26*   (2009.01)
  (Continued)

(52) U.S. Cl.
  CPC .......... *H04W 48/02* (2013.01); *H04W 28/26* (2013.01); *H04W 72/02* (2013.01); *H04W 72/0406* (2013.01); *H04W 72/046* (2013.01)

(58) Field of Classification Search
  CPC ..... H04W 48/02; H04W 28/26; H04W 72/02; H04W 72/0406; H04W 72/046;
  (Continued)

(56) References Cited

U.S. PATENT DOCUMENTS

2021/0204250 A1*   7/2021   Ashraf ................. H04W 4/70
2022/0061041 A1*   2/2022   Chen ................... H04L 5/0048

FOREIGN PATENT DOCUMENTS

WO   WO-2019157739 A1   8/2019
WO   WO-2019192701 A1   10/2019

OTHER PUBLICATIONS

Ericsson: "PHY Layer Structure for NR Sidelink", 3GPP TSG RAN WG1 #99, 3GPP Draft; R1-1912597, 3rd Generation Partnership Project (3GPP), Mobile Competence Centre, 650, Route Des Lucioles, F-06921 Sophia-Antipolis Cedex, France, vol. RAN WG1, No. Reno, NV, US, Nov. 18, 2019-Nov. 22, 2019, Nov. 8, 2019 (Nov. 8, 2019), 32 Pages, XP051820108, Retrieved from the Internet: URL: https://ftp.3gpp.org/tsg_ran/WG1_RL1/TSGR1_99/Docs/R1-1912597. zip R1-1912597 Ericsson PHY layer structure for NR sidelink.docx [retrieved on Nov. 8, 2019] Section 7, The whole document, Section 3.3 DMRS Design for PSCCH, Section 4 SCI Content, Section 6 PSSCH Design.

(Continued)

*Primary Examiner* — Eric Myers
(74) *Attorney, Agent, or Firm* — Loza & Loza, LLP

(57) ABSTRACT

Aspects directed towards reserving resources for sidelink communications are disclosed. In one example, an initial sidelink communication is transmitted which includes an indication of resources reserved for a subsequent sidelink communication. A transmission restriction is applied for the subsequent sidelink communication based on a transmission characteristic associated with transmitting the initial sidelink communication. The subsequent sidelink communication is then transmitted according to the transmission restriction.

37 Claims, 11 Drawing Sheets

(51) Int. Cl.
 *H04W 72/04* (2009.01)
 *H04W 72/02* (2009.01)
 *H04W 72/044* (2023.01)
(58) Field of Classification Search
 CPC ....... H04W 8/04; H04W 40/22; H04W 76/14; H04B 7/0619; H04L 47/72
 See application file for complete search history.

(56) References Cited

OTHER PUBLICATIONS

International Search Report and Written Opinion—PCT/US2020/061063—ISA/EPO—dated Feb. 24, 2021.

Kyocera., et al., "Sidelink Physical Layer Structure", 3GPP TSG-RAN WG1#98bis, 3GPP Draft, R1-1911273, 3rd Generation Partnership Project (3GPP), Mobile Competence Centre, 650, Route Des Lucioles, F-06921 Sophia-Antipolis Cedex, France, vol. RAN WG1, No. Chongquing, China, Oct. 14, 2019-Oct. 18, 2019, Oct. 4, 2019 (Oct. 4, 2019), pp. 1-5, XP051808373, Retrieved from the Internet: URL:https://www.3gpp.org/ftp/TSG_RAN/WG1_RL1/TSGR1_98b/Docs/R1-1911273.zip, R1-1911273.doc, [retrieved on Oct. 4, 2019], The whole document.

MCC Support: "Final Report of 3GPP TSG RAN WG1 #98bis v2.0.0 (Chongqing, China, Oct. 14-20, 2019)", 3GPP TSG RAN WG1 Meeting #99, R1-1913275, 3GPP Draft, Final Minutes Report RAN1#98B V200, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 17, 2019 (Nov. 17, 2019), 160 Pages, XP055809217, pp. 121-121, p. 121 of 160 Pages, Retrieved from the Internet: URL:https://www.3gpp.org/ftp/tsg_ran/WG1_RL1/TSGR1_98b/Report/Final_Minutes_report_RAN1%2398b_v200.zip, Final_Minutes_Report_RAN1#98b_v200.docx [Retrieved on Nov. 17, 2019]-Section 7.2.4. 5G V2X with NR sidelink, p. 63-p. 69 Annex F: List of Actions, p. 141-p. 151, The whole document.

Qualcomm Incorporated: "Considerations on Physical Layer Aspects of NR V2X", 3GPP TSG RAN WG1 Meeting #98, 3GPP Draft, R1-1909252 Considerations on Physical Layer Aspects of NR V2X, 3rd Generation Partnership Project (3GPP), Mobile Competence Centre, 650, Route Des Lucioles, F-06921 Sophia-Antipolis Cedex, France, vol. RAN WG1, No. Prague, CZ, Aug. 26, 2019-Aug. 30, 2019, Aug. 16, 2019 (Aug. 16, 2019), 18 Pages, XP051765857, Retrieved from the Internet: URL:https://www.3gpp.org/ftp/tsg_ran/WG1_RL1/TSGR1_98/Docs/R1-1909252.zip [retrieved on Aug. 16, 2019], Section 3, Physical Layer Procedures.

* cited by examiner

RESERVING RESOURCES FOR SUBSEQUENT SIDELINK TRANSMISSIONS VIA AN INITIAL SIDELINK CONTROL INFORMATION COMMUNICATION

PRIORITY CLAIM

This application claims priority to and the benefit of provisional patent application No. 62/937,194 filed in the United States Patent & Trademark Office on Nov. 18, 2019, the entire content of which is incorporated herein by reference as if fully set forth below in its entirety and for all applicable purposes.

TECHNICAL FIELD

The technology discussed below generally relates to wireless communication systems, and more particularly, to utilizing an initial sidelink control information (SCI) communication to reserve resources for subsequent sidelink transmissions.

INTRODUCTION

Sidelink communications were initially introduced as a Long Term Evolution (LTE) feature to enable device-to-device (D2D) communications within legacy cellular-based LTE radio access networks. For comparison, in a legacy uplink/downlink, a user equipment (UE) may communicate with another UE through the Uu interface and data traverses the LTE eNode B (eNB). A sidelink, however, enables the direct communication between proximal UEs using the newly defined PC5 interface so that data does not need to go through the eNB.

Sidelink communications will continue to be supported by 5G New Radio (NR) networks. With respect to reserving resources for sidelink communications, a UE may utilize control information to reserve resources for sidelink communication.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method of wireless communication by a user equipment (UE) is disclosed. The method includes transmitting an initial sidelink communication, wherein an initial sidelink control information (SCI) transmission includes an indication of resources reserved for a subsequent sidelink communication, applying a transmission restriction for the subsequent sidelink communication, wherein the transmission restriction is based on a transmission characteristic associated with the transmitting of the initial sidelink communication, and transmitting the subsequent sidelink communication according to the transmission restriction.

In another example, a UE for wireless communication is disclosed. The UE includes at least one processor, a transceiver communicatively coupled to the at least one processor, and a memory communicatively coupled to the at least one processor. The at least one processor may be configured to transmit an initial sidelink communication, wherein an initial SCI transmission includes an indication of resources reserved for a subsequent sidelink communication, apply a transmission restriction for the subsequent sidelink communication, wherein the transmission restriction is based on a transmission characteristic associated with transmitting the initial sidelink communication, and transmit the subsequent sidelink communication according to the transmission restriction.

In another example, a non-transitory computer-readable storage medium having instructions for a UE thereon may be disclosed. The instructions, when executed by a processing circuit, cause the processing circuit to transmit an initial sidelink communication, wherein an initial SCI transmission includes an indication of resources reserved for a subsequent sidelink communication, apply a transmission restriction for the subsequent sidelink communication, wherein the transmission restriction is based on a transmission characteristic associated with transmitting the initial sidelink communication, and transmit the subsequent sidelink communication according to the transmission restriction.

In a further example, a UE for wireless communication may be disclosed. The UE includes means for transmitting an initial sidelink communication, wherein an initial SCI transmission includes an indication of resources reserved for a subsequent sidelink communication, means for applying a transmission restriction for the subsequent sidelink communication, wherein the transmission restriction is based on a transmission characteristic associated with transmitting the initial sidelink communication, and means for transmitting the subsequent sidelink communication according to the transmission restriction.

These and other aspects of the invention will become more fully understood upon a review of the detailed description, which follows. Other aspects, features, and examples of the present invention will become apparent to those of ordinary skill in the art, upon reviewing the following description of specific, examples of the present invention in conjunction with the accompanying figures. While features of the present invention may be discussed relative to certain examples and figures below, all examples of the present invention can include one or more of the advantageous features discussed herein. In other words, while one or more examples may be discussed as having certain advantageous features, one or more of such features may also be used in accordance with the various examples of the invention discussed herein. In similar fashion, while examples may be discussed below as device, system, or method examples it should be understood that such examples can be implemented in various devices, systems, and methods.

DETAILED DESCRIPTION

Figure 1:
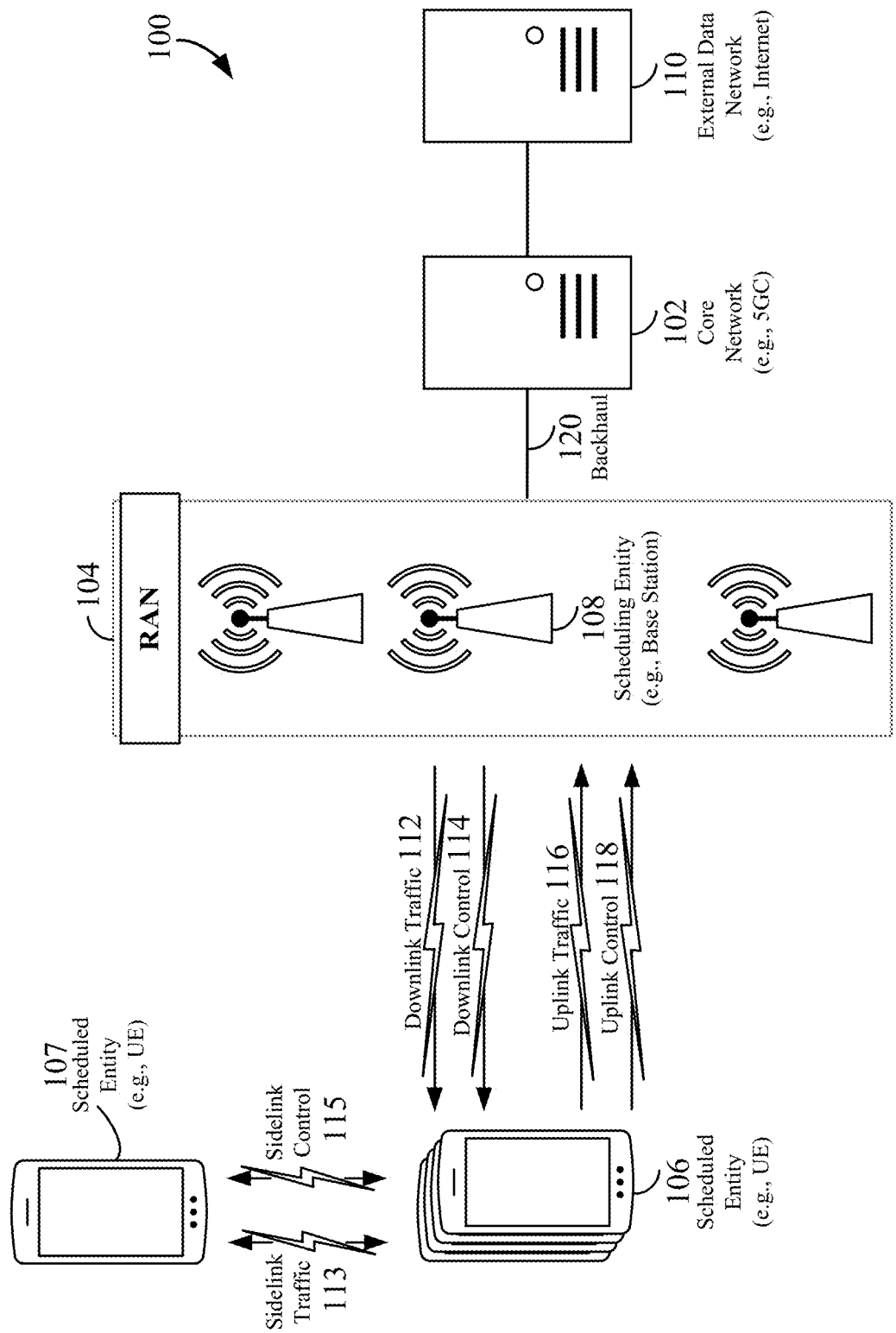
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For instance, examples and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Various aspects directed towards a wireless communication device (e.g., a user equipment (UE)) are disclosed. In one example, the wireless communication device transmits an initial sidelink communication according to an initial precoder in which the initial sidelink communication includes an initial sidelink control information (SCI) transmission and a corresponding initial sidelink data transmission. The initial SCI transmission may further include an indication of resources reserved for a subsequent sidelink communication. The wireless communication device may also apply a transmission restriction for the subsequent sidelink communication in which the subsequent sidelink communication includes a subsequent SCI transmission and a corresponding subsequent sidelink data transmission. For example, the transmission restriction may be based on a transmission characteristic associated with the transmitting of the initial sidelink communication. The wireless communication device then transmits the subsequent sidelink communication according to the transmission restriction.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, where a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
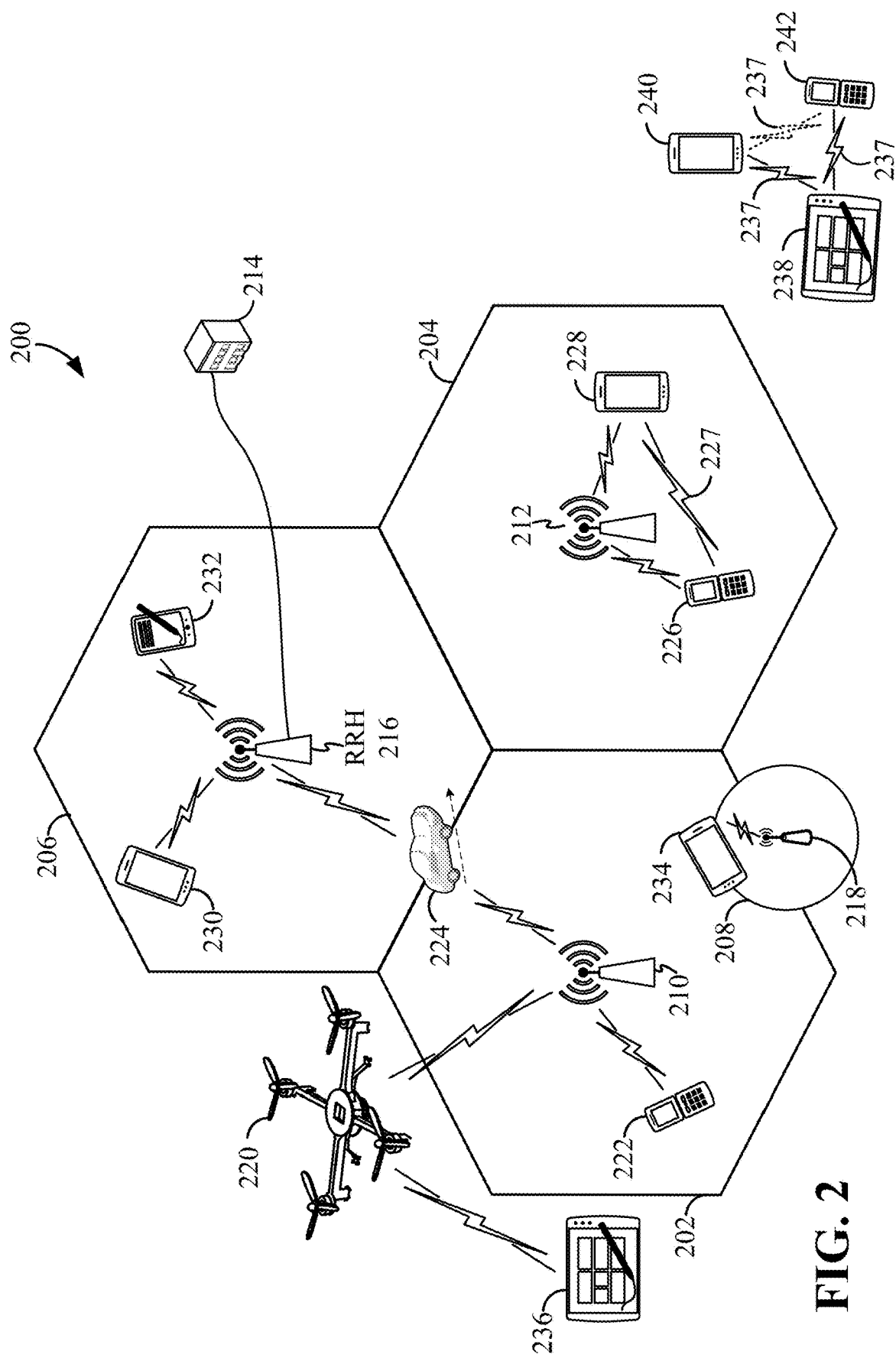
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

In a further aspect of the RAN 200, sidelink signals may be used between UEs without necessarily relying on scheduling or control information from a base station. For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In some examples, referring again to FIG. 1, scheduled entities such as a first scheduled entity 106 and a second scheduled entity 107 may utilize sidelink signals for direct D2D communication (e.g., a V2X communication). Sidelink signals may include sidelink traffic 113 and sidelink control 115. In some examples, the sidelink control 115 may include synchronization information to synchronize communication on the sidelink channel. In addition, the sidelink control 115 may include scheduling information indicating one or more resource blocks reserved by the transmitting sidelink device to transmit the sidelink traffic 113 to the receiving sidelink device. In some examples, the scheduling information may further include information related to the traffic 113, such as a modulation and coding scheme utilized for the traffic 113. In some examples, the sidelink control 115 may be transmitted within a physical sidelink control channel (PSCCH), while the sidelink data 130 may be transmitted within a physical sidelink shared channel (PSSCH).

In certain aspects, a scheduled entity 106 that is out-of-coverage (OOC) of a base station and has lost synchronization with a synchronization source on which a V2X communication is based, may maintain the V2X communication based on packet timing information received from other synchronized devices (e.g., scheduled entity 107). The timing for the V2X communication may further be based on parameter values from a higher layer of the respective other synchronized devices. By way of example, the scheduled entity 106 may receive a proximity service (ProSe) PC5 transmission from two or more peer UEs including a first scheduled entity and a second scheduled entity. If the first scheduled entity has low propagation delay and a high time confidence as seen by the scheduled entity 106, a timing estimate based on the first scheduled entity may be better (i.e. closer to satellite timing) than a timing estimate based on the timing of the second scheduled entity, which may have high propagation delay and low time confidence. Higher layer metrics, such as a time confidence parameter, positional uncertainty parameter, or others can be obtained from a higher layer message. One example of a higher layer message that includes this information is a basic safety message which may be required by certain communication standards. In some cases, a basic safety message is transmitted periodically, such as every 100 milliseconds. Based on the higher layer parameters, the scheduled entity 106 can determine how much priority (i.e., trust or weight) to give to packets from particular scheduled entities. Although some devices may have a better timing estimate, those with smaller estimates can still help improve the accuracy of a calculated timing as the calculated timing may be statistically improved by using timing estimates from a larger number of peer devices. In some cases a weight of zero may be applied to effectively remove an estimate for a specific peer device from the computed timing adjustment. In other cases, a non-zero weight for a first scheduled entity may be assigned that is less than a non-zero weight of a second scheduled entity. Further discussion of generating weights for a specific scheduled entity and for calculating a weighted timing adjustment is provided below.

Figure 3:
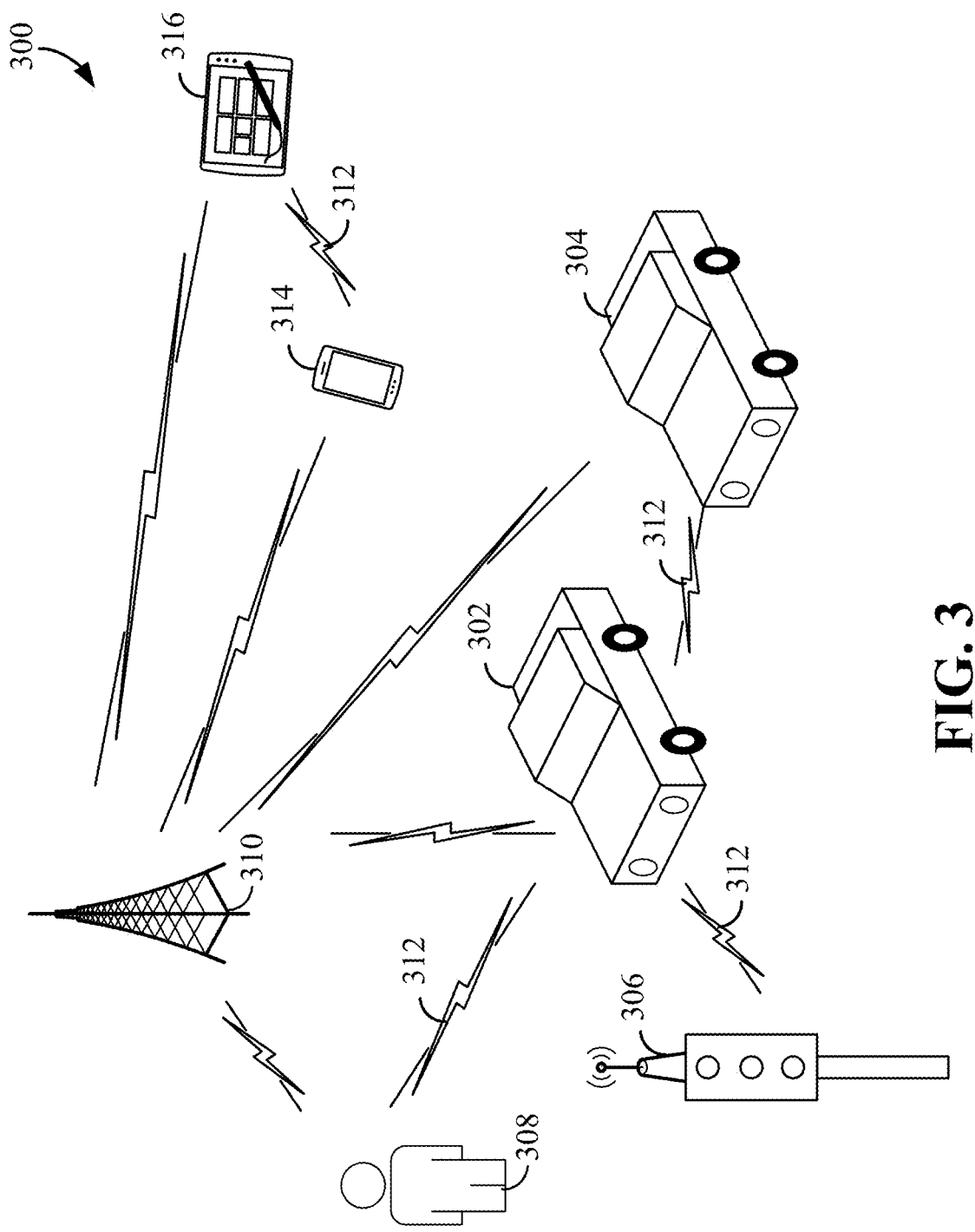
FIG. 3 is a diagram illustrating an example of a wireless communication network employing sidelink communication according to some aspects.

FIG. 3 illustrates an example of a wireless communication network 300 configured to support D2D or sidelink communication. In some examples, sidelink communication may include V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 occurs over a proximity service (ProSe) PC5 interface 312. In various aspects of the disclosure, the PC5 interface 312 may further be utilized to support D2D communication in other proximity use cases. Examples of other proximity use cases may include public safety or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., V-UEs 302 and 304 and P-UE 308) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., UEs 314 and 316) are in communication with the base station 310 (e.g., gNB) via a Uu (e.g., cellular interface) connection to receive ProSe service authorization and provisioning information to support ProSe operations.

Figure 4:
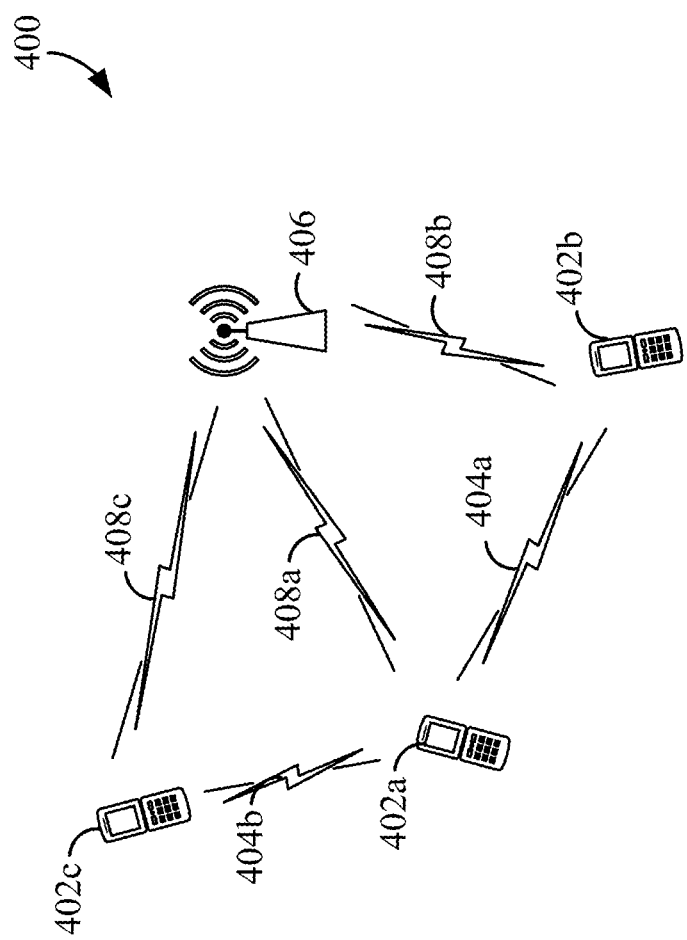
FIG. 4 is a diagram illustrating an example of a wireless communication system for facilitating both cellular and sidelink communication according to some aspects.

FIG. 4 is a diagram illustrating an example of a wireless communication system 400 for facilitating both cellular and sidelink communication. The wireless communication system 400 includes a plurality of UEs 402a, 402b, and 402c and a base station (e.g., eNB or gNB) 406. In some examples, the UEs 402a, 402b, and 402c may be UEs capable of implementing D2D or V2X devices (e.g., RSUs, V-UEs, P-UEs, etc.) within a V2X network.

The UEs 402a and 402b may communicate over a first PC5 interface 404a, while UEs 402a and 402c may communicate over a second PC5 interface 404b. UEs 402a, 402b, and 402c may further communicate with the base station 406 over respective Uu interfaces 408a, 408b, and 408c. The sidelink communication over the PC5 interfaces 404a and 404b may be carried, for example, in a licensed frequency domain using radio resources operating according to a 5G NR or NR sidelink (SL) specification and/or in an unlicensed frequency domain, using radio resources operating according to 5G new radio-unlicensed (NR-U) specifications.

In some examples, a common carrier may be shared between the PC5 interfaces 404a and 404b and Uu interfaces 408a-408c, such that resources on the common carrier may be allocated for both sidelink communication between UEs 402a-402c and cellular communication (e.g., uplink and downlink communication) between the UEs 402a-402c and the base station 406. For example, the wireless communication system 400 may be configured to support a V2X network in which resources for both sidelink and cellular communication are scheduled by the base station 406. In other examples, the UEs 402a-402c may autonomously select sidelink resources (e.g., from one or more frequency bands or sub-bands designated for sidelink communication) for communication therebetween. In this example, the UEs 402a-402c may function as both scheduling entities and scheduled entities scheduling sidelink resources for communication with each other.

Figure 5:
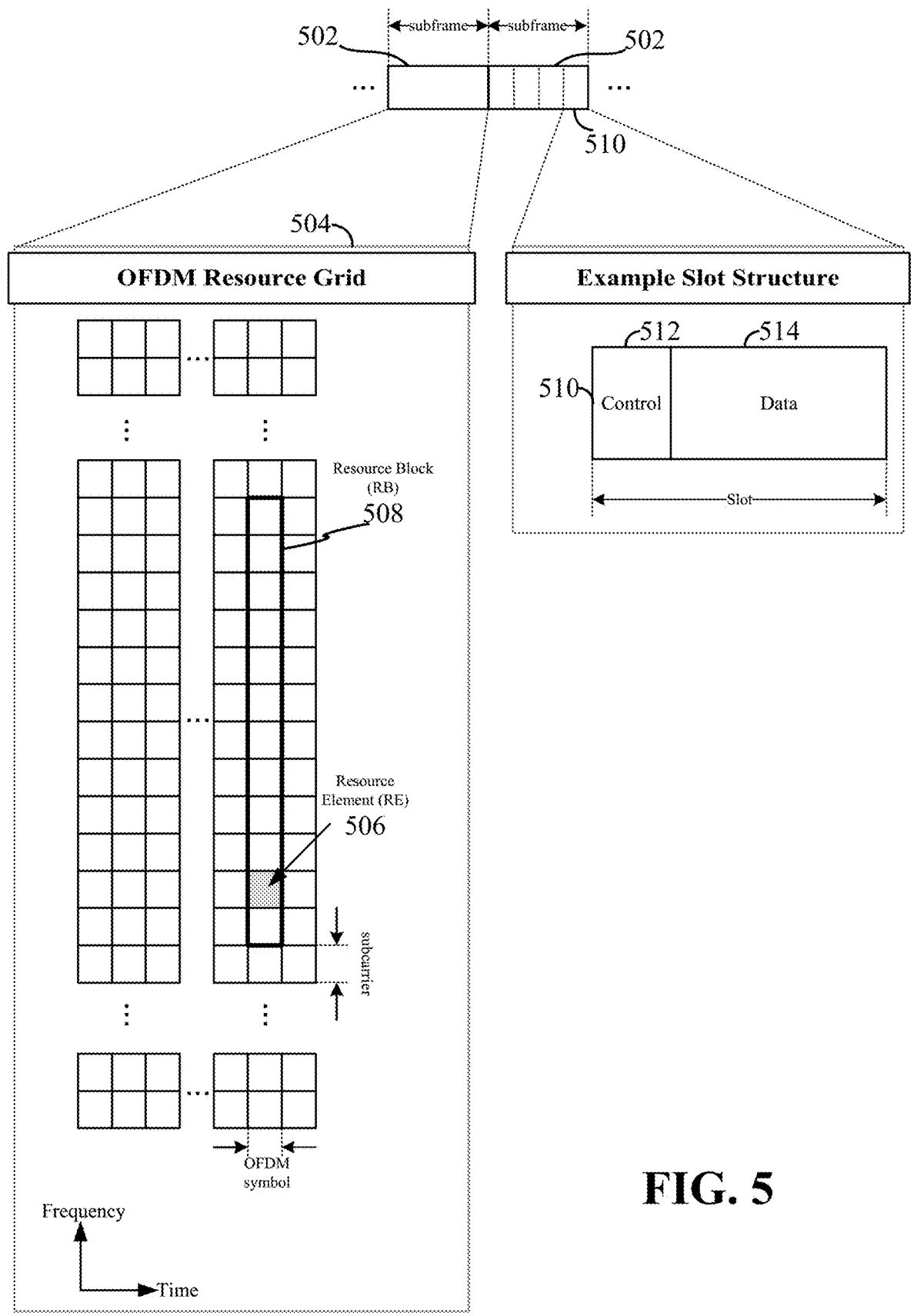
FIG. 5 is a schematic illustration of an organization of wireless resources in an air interface utilizing orthogonal frequency divisional multiplexing (OFDM) according to some aspects.

Referring now to FIG. 5, an expanded view of an exemplary subframe 502 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 504 may be used to schematically represent time-frequency resources for a given antenna port. That is, in a multiple-input-multiple-output (MIMO) implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

Scheduling of UEs or sidelink devices (hereinafter collectively referred to as UEs) for downlink, uplink, or sidelink transmissions typically involves scheduling one or more resource elements 506 within one or more sub-bands. Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels, and the data region 514 may carry data channels. Of course, a slot may contain all DL, all UL, or at least one DL portion and at least one UL portion. The simple structure illustrated in FIG. 5 is merely exemplary in nature, and different slot structures may be utilized, and may include one or more of each of the control region(s) and data region(s).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, where the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 5 are not necessarily all of the channels or carriers that may be utilized between devices, and those of ordinary skill in the art will recognize that other channels or carriers may be utilized in addition to those illustrated, such as other traffic, control, and feedback channels.

In 5G NR (e.g., V2X), sidelink communication may utilize transmission or reception resource pools. For example, the minimum resource allocation unit in frequency may be a sub-channel (e.g., which may include, for example, 10, 15, 20, 25, 50, 75, or 100 consecutive RBs) and the minimum resource allocation unit in time may be one slot. A radio resource control (RRC) configuration of the resource pools may be either pre-configured (e.g., pre-loaded on the UE) or configured by the base station (e.g., gNB).

In addition, there may be two main resource allocation modes of operation for sidelink (e.g., PC5) communications. In a first mode, Mode 1, a radio access network (RAN) node (e.g., gNB) may allocate resources to UEs for sidelink communication between the UEs in various manners. For example, the RAN node may allocate sidelink resources dynamically (e.g., a dynamic grant) to UEs, in response to requests for sidelink resources from the UEs. The RAN node may further activate preconfigured sidelink grants (e.g., configured grants) for sidelink communication among the UEs. In Mode 1, sidelink feedback may be reported back to the RAN node by a transmitting UE.

In a second mode, Mode 2, the UEs may autonomously select sidelink resources for sidelink communication therebetween. In some examples, a transmitting UE may perform resource/channel sensing to select resources (e.g., sub-channels) on the sidelink channel that are unoccupied.

Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). SCI-1 may also include a physical sidelink shared channel (PSSCH) resource assignment and a resource reservation period (if enabled). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

Figure 6:
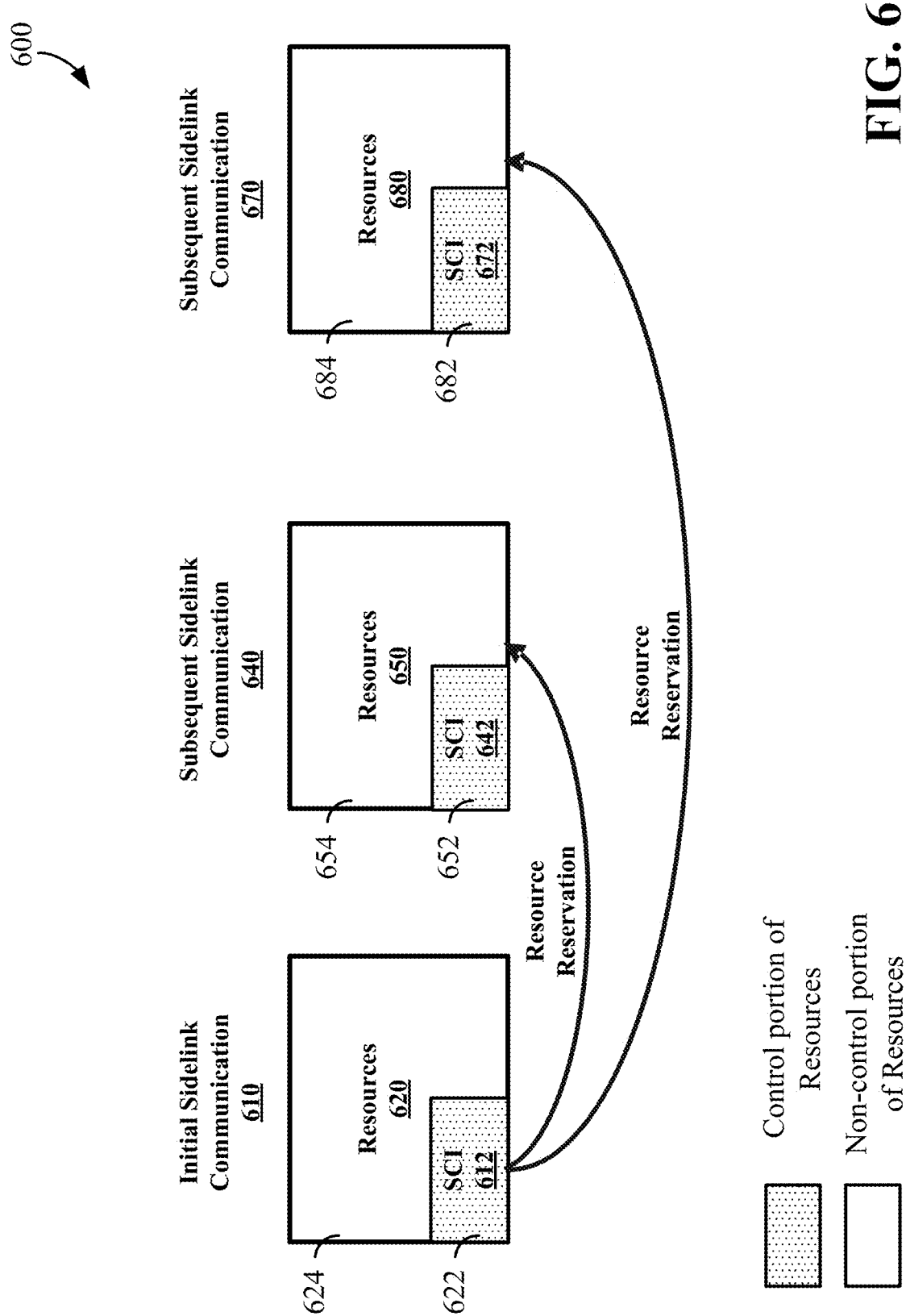
FIG. 6 illustrates an exemplary reservation of resources to transmit subsequent sidelink communications according to some aspects.

Various aspects disclosed herein are directed towards utilizing an initial sidelink control information (SCI) communication to reserve resources for subsequent sidelink transmissions. A transmission in a sidelink communication may include data and the SCI. The sidelink communications between UEs may be reservation-based. For example, the UE may utilize an SCI (e.g., SCI-1) for a current sidelink communication to reserve up to two future resources for future sidelink communications. FIG. 6 is an example diagram 600 illustrating an exemplary reservation of resources to transmit subsequent sidelink communications in accordance with aspects disclosed herein. For instance, with reference to FIG. 6, a transmitting UE may transmit an initial (current) sidelink communication 610 within resources 620 (e.g., of a slot). The initial sidelink communication 610 includes an initial SCI 612 transmitted within a first portion of the resources 620 that reserves a subsequent portion of the resources 620 for an initial sidelink data transmission Here, the initial SCI 612 may be transmitted within a control portion 622 of the resources 620 and the sidelink data may be transmitted within a non-control portion 624 (e.g., a data portion) of the resources 620. The initial SCI 612 may be an SCI-1. The initial SCI 612 may also reserve resources 650 for a subsequent sidelink communication 640, where the resources 650 may include a control portion 652 for transmitting a subsequent SCI 642 and a non-control portion 654 for transmitting sidelink data. Further, the initial SCI 612 may also reserve resources 670 for an additional subsequent sidelink communications 670. Similarly, the SCI 642 and the SCI 672 may reserve resources for any subsequent sidelink communications as well.

As discussed above, in Mode 2, a transmitting UE may autonomously allocate sidelink resources for sidelink communications, without involving a base station. In Mode 2, a receiving UE may sense whether a future resource reserved by a transmitting UE is available (e.g., to be used by the receiving UE and/or other UEs). For instance, with reference to FIG. 6, a receiving UE may be configured to receive the initial SCI 612 from the transmitting UE, decode the initial SCI 612, and perform a power measurement (e.g., a Reference Signal Receive Power (RSRP) measurement) on an associated DMRS. The DMRS may be either a control DMRS (e.g., DMRS associated with a PSCCH) or a data DMRS (e.g., a DMRS associated with a PSSCH). The transmitting UE may precode the DMRS in sidelink communications prior to transmitting the DMRS. If the power measurement does not exceed a threshold, then the future resources 650, 680 are deemed available even though the transmitting UE and the receiving UE may both use those future resources 650, 680 to transmit. Namely, if the sensed power is low, it is expected that interference from the transmitting UE (or any other devices) will not be significant even though two transmissions are on the same resource. On the other hand, if the power measurement exceeds the threshold, then the future resources 650, 680 reserved by the initial SCI 104 are considered occupied. For example, if the power measurement exceeds the threshold, the receiving UE may allocate different resources other than the future resources 650, 680, and the receiving UE and/or the transmitting UE may the different resources for any future sidelink communications.

Data, control information, and/or a DMRS in sidelink communication may be precoded, which may be performed by a transmitting UE. In an aspect, such precoding may be performed during beam forming for the transmitting UE, e.g., by applying a specific precoding matrix. For example, the precoding may be associated with a beam direction of the transmitting UE and may also be associated with a transmit power. If precoding changes between the initial sidelink communication 610 and any of the future sidelink communications 640, 670, the interference on the future sidelink communications 640, 670 may be very different from the interference expected based on the power measurement associated with the initial SCI 612. In an example, a transmitting UE may use a particular precoder to precode a DMRS in the initial sidelink communication, and a receiving UE receiving the initial SCI may measure a low RSRP (e.g., below the threshold) on the DMRS associated with the initial SCI and thus may determine that the resources are available for a subsequent sidelink communication. In this example, if the transmitting UE uses a different precoder to precode a DMRS in a subsequent sidelink communication, the resources expected to be available based on the low RSRP measurement during the initial sidelink communication may experience a stronger interference. Therefore, changing the precoder between sidelink communications may cause problems in resource allocations. Aspects disclosed herein are directed towards ensuring that the power (e.g., RSRP) measurement associated with the initial sidelink communication provides meaningful information about the future sidelink communications.

According to some aspects of the disclosure, it is contemplated that a transmitting UE may place restrictions on future sidelink communications (e.g., 640, 670) to ensure that a receiving UE receiving an initial sidelink communication from the transmitting UE reliably senses resource availability for the future sidelink communications (e.g., 640, 670) based on a power measurement on the initial sidelink communication (e.g., 610). Hence, the transmitting UE may apply a transmission restriction on a future sidelink communication, and may transmit the future sidelink communication based on the transmission restriction, where the transmission restriction may be based on a transmission characteristic associated with the transmission of the initial sidelink communication. The transmitting UE may be a UE illustrated in one or more of FIGS. 1-4, and the receiving UE may be a UE illustrated in one or more of FIGS. 1-4 communicating with the transmitting UE. Although the examples illustrated herein describe the transmitting UE transmitting a sidelink communication to the receiving UE, the receiving UE may also be capable of transmitting a sidelink communication the transmitting UE.

Figure 7:
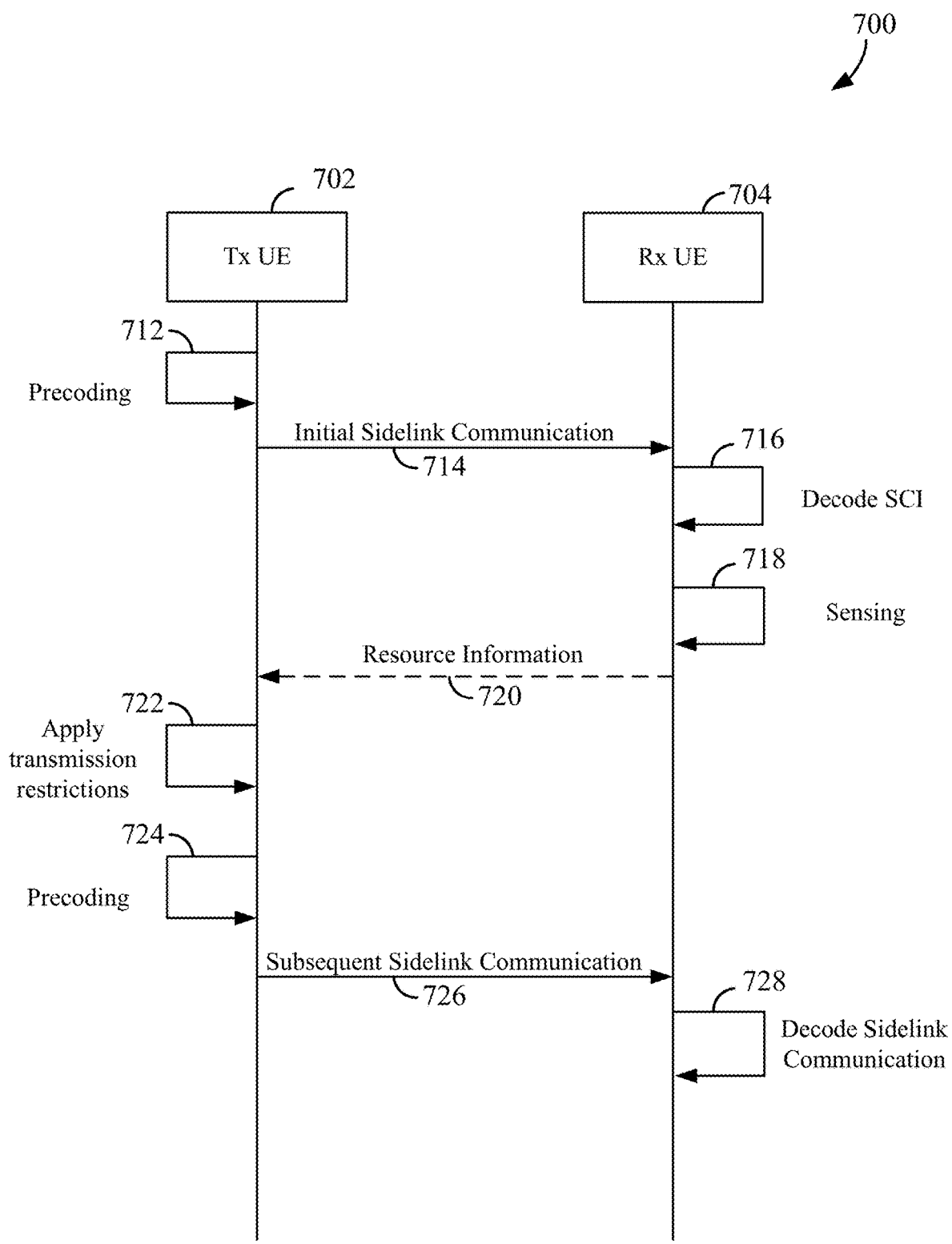
FIG. 7 is an example flow diagram illustrating a sidelink communication between two user equipment, according to some aspects.

FIG. 7 is an example flow diagram illustrating a sidelink communication between two user equipment, according to some aspects. In FIG. 7, a transmitting UE 702 and a receiving UE 704 may communicate with each other via a sidelink. At 712, the transmitting UE 702 precodes data, control information (e.g., SCI), and/or a DMRS associated with an initial sidelink communication. At 714, the transmitting UE 702 transmits an initial sidelink communication to the receiving UE 704. The initial sidelink communication may include an initial SCI that includes an indication of resources reserved for a subsequent sidelink communication.

At 716, the receiving UE 704 may decode the initial SCI from the initial sidelink communication and determine the resources reserved for the subsequent sidelink communication based on the initial SCI. At 718, the receiving UE 704 may sense whether the resources reserved by the initial SCI are available to be used for the subsequent sidelink communication. In an aspect, the receiving UE 704 may measure the power (e.g., RSRP) on a DMRS associated with the initial SCI received via the initial sidelink communication and may sense whether the resources reserved by the initial SCI are available by sensing whether a power value according to the power measurement (e.g., the RSRP measurement) exceeds a power threshold. If the power value according to the power measurement does not exceed the power threshold, the receiving UE 704 may utilize the resources reserved by the initial SCI for a subsequent sidelink communication.

If the power value according to the power measurement exceeds the power threshold the receiving UE 704 may reserve different resources for the subsequent sidelink communication. In this case, the receiving UE 704 may perform a subsequent sidelink communication using the different resources reserved and may avoid utilizing the resources reserved by the initial SCI. In an aspect, at 720, the receiving UE 704 may transmit to the transmitting UE 706 resource information to indicate that the resources reserved by the initial SCI are occupied and/or that the different resources are reserved for the subsequent sidelink communication.

At 722, the transmitting UE 702 may apply a transmission restriction for the subsequent sidelink communication. In an aspect, the transmission restriction may be based on a transmission characteristic associated with the transmitting of the initial sidelink communication. For example, the transmission restriction may be placed such that the sensing results from the sensing at 718 may be consistent. The example in FIG. 7 illustrates the transmission restriction being applied after transmitting the initial sidelink communication. In another example, the transmission restriction may be applied prior to transmitting the initial sidelink communication and/or an initial transmission restriction may be applied for the initial sidelink communication prior to transmitting the initial sidelink communication.

At 724, the transmitting UE 702 precodes data, control information (e.g., SCI), and/or a DMRS associated with an initial sidelink communication. In an aspect, the transmitting UE 702 performs the precoding at 724 based on the transmission restriction.

At 726, the transmitting UE 702 may transmit the subsequent sidelink communication to the receiving UE 704 according to the transmission restriction applied at 724. At 728, the receiving UE 704 receives and decodes the subsequent sidelink communication.

In an aspect, the transmission restriction may configure the transmitting UE to use the same precoder for all sidelink communications reserved and associated with the same SCI (e.g., where each of sidelink communications 610, 640, 670 are transmitted with the same precoder). Hence, for example, the transmitting UE 702 may use the same precoder for the initial sidelink communication and the subsequent sidelink communication transmitted over the resources reserved by the initial SCI of the initial sidelink communication. For example, the same precoder identity may be set for all sidelink communications to configure the transmitting UE to use the same precoder for all sidelink communications.

As discussed above, each sidelink communication may include a control portion and a data portion, where the control portion may include the SCI. The control portion may include a PSCCH and the data portion may include a PSSCH. For example, as discussed above, the initial sidelink communication 610 may include a control portion transmitted via the control portion 622 of the resources 620 and may include a data portion transmitted via the non-control portion 624 of the resources 620. Prior to transmitting a sidelink communication, the transmitting UE may use a data precoder to precode the data portion of the sidelink communication, and may use a control precoder to precode the control portion of the sidelink communication. In an aspect, the transmitting UE 702 may use a same data precoder for precoding a data portion of the initial sidelink communication and for precoding a data portion of a subsequent sidelink communication. In an aspect, the transmitting UE 702 may use a same control precoder for precoding a control portion of the initial sidelink communication and for precoding a control portion of a subsequent sidelink communication. In an aspect, the transmitting UE 702 may use a same data precoder for precoding a data DMRS of the initial sidelink communication and for precoding a data DMRS of a subsequent sidelink communication, and may use a same control precoder for precoding a control DMRS of the initial sidelink communication and for precoding a control DMRS of a subsequent sidelink communication.

In an aspect, the transmission restriction may configure the transmitting UE to use the same reference signal port(s) (e.g., DMRS port(s)) for all sidelink communications reserved and associated with the same SCI (e.g., where each of sidelink communications 610, 640, 670 are transmitted with the same DMRS ports). For example, according to this transmission restriction, the same DMRS port(s) may be used for all sidelink communications, regardless whether the same precoders or different precoders are used for various sidelink communications. Hence, for example, the transmitting UE 702 may use the same DMRS port(s) for the initial sidelink communication and the subsequent sidelink communication transmitted over the resources reserved by the initial SCI of the initial sidelink communication. Because transmission characteristics may be inferred from a particular DMRS port, utilizing the same DMRS port for all of the sidelink communications may ensure that all of the sidelink communications may be performed in a consistent manner.

In an aspect, the transmission restriction may cause the transmitting UE and/or the sensing UE to assume that the reference signal ports (e.g., DMRS ports) for sidelink transmissions reserved and associated with the same SCI are quasi co-located. Two antenna ports may be said to be quasi co-located (QCL) if properties of the channel over which a symbol on one antenna port is conveyed can be inferred from the channel over which a symbol on another antenna port is conveyed. For instance, unless pre-configured otherwise, the transmitting UE and/or the receiving UE may be configured to assume a quasi co-location (QCL) of the DMRS ports for the initial sidelink transmission and all subsequent sidelink transmissions. For example, the reference signal ports of the initial and subsequent sidelink transmissions may be QCLed based on at least one of an average gain, a Type A QCL (e.g., a QCL based on Doppler shift, Doppler spread, average delay, and/or delay spread), a Type D QCL (e.g., a QCL based on a spatial Rx parameter), and/or a spatial domain transmission filter. For example, according to this transmission restriction, the transmitting UE (e.g., transmitting UE 702) and/or the receiving UE (e.g., receiving UE 704) may be configured to assume a QCL of the DMRS ports based on at least one of the average gain, the Type A QCL, the Type D QCL, and/or the spatial domain transmission filter, regardless of whether the same precoder or different precoders are used for various sidelink communications and regardless of whether the same DMRS port or different DMRS ports are used for various sidelink communications. Further, in an aspect, a different number of DMRS ports may be set for different sidelink communications, as long as there is at least one common DMRS port between the different sidelink communications. For example, when DMRS port #0 is set for the initial sidelink communication and DMRS port #0 and #1 are set for the subsequent sidelink communication, the transmission characteristics may be inferred from DMRS port #0 and may be used for the subsequent sidelink communication via DMRS port #1, even if DMRS port #0 is not used for the subsequent sidelink communication.

In an aspect, the transmitting UE may apply the transmission restriction according to a pre-configuration. In an aspect, the pre-configuration may indicate whether to enable or disable the transmission restriction. In an aspect, the pre-configuration indicates which transmission restriction to use (e.g., out of the above-discussed transmission restrictions).

In an aspect, it is contemplated that the examples disclosed herein may be implemented so as to ensure that any of the transmission restrictions (e.g., transmission restrictions discussed above) on subsequent sidelink communications is placed on either pairs of sidelink control transmissions or pairs of sidelink data transmissions. In an aspect, the restrictions may not be placed on a pair that includes a sidelink control transmission and a sidelink data transmission. For instance, transmission restrictions on subsequent sidelink communications 640, 670 may be placed on sidelink control transmissions, where the receiving UE senses the transmitting UE based on RSRP measurements performed on the PSCCH for each of the subsequent sidelink communications 640, 670. Similarly, transmission restrictions on subsequent sidelink communications 640, 670 may be placed on sidelink data transmissions, where the receiving UE senses the transmitting UE based on RSRP measurements performed on the PSSCH for each of the subsequent sidelink communications 640, 670.

Figure 8:
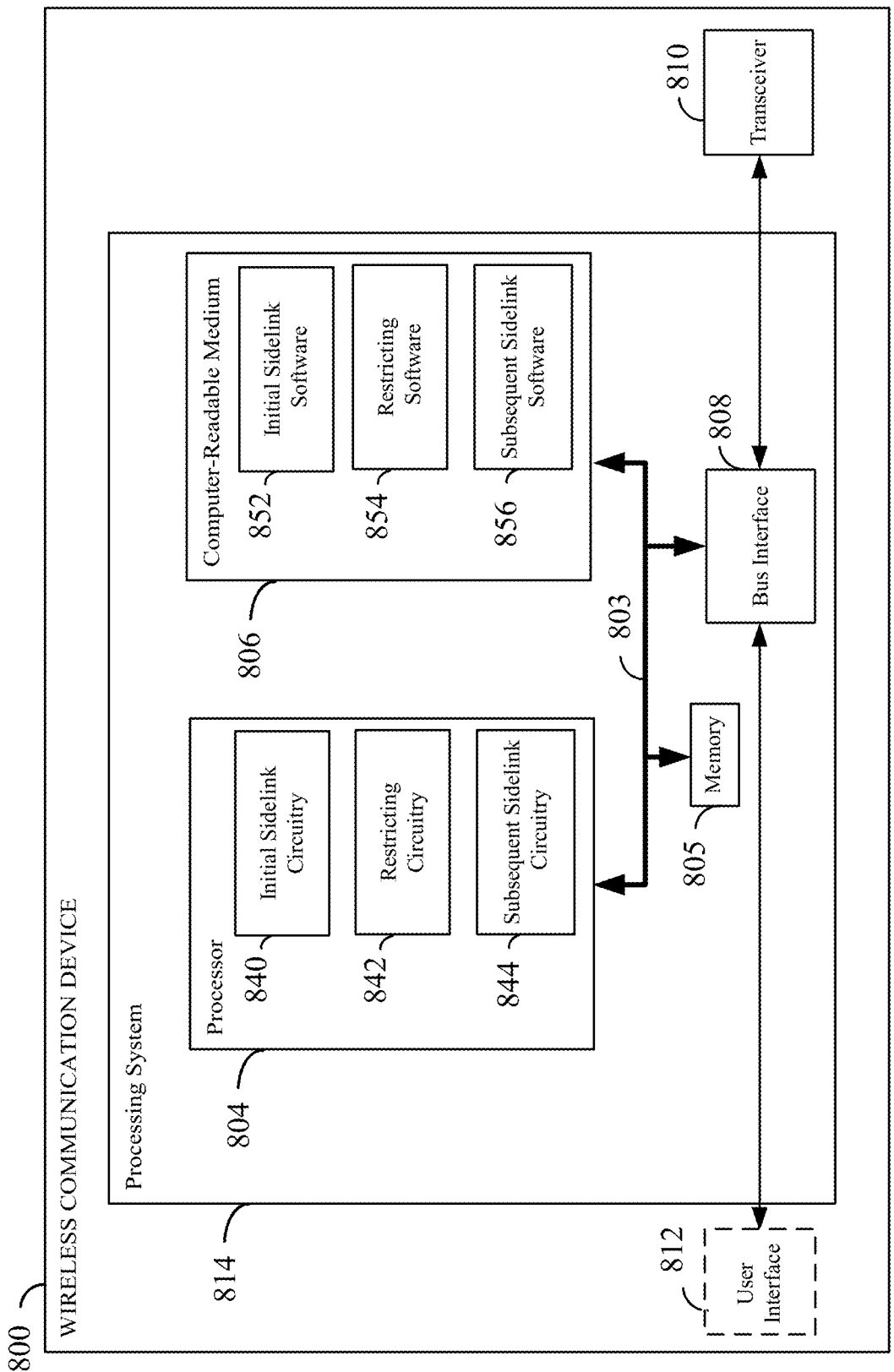
FIG. 8 is a block diagram illustrating an example of a hardware implementation for a wireless communication device employing a processing system according to some aspects.

FIG. 8 is a block diagram illustrating an example of a hardware implementation for a wireless communication device 800 employing a processing system 814. For example, the wireless communication device 800 may be a UE as illustrated in any one or more of the FIGS. disclosed herein.

The wireless communication device 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 800 may be configured to perform any one or more of the functions described herein. That is, the processor 804, as utilized in a wireless communication device 800, may be used to implement any one or more of the processes and procedures described below and illustrated in FIGS. 9-11.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable storage medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium. Depending upon the nature of the apparatus, a user interface 812 (e.g., keypad, display, speaker, microphone, joystick) may also be provided.

The processor 804 is responsible for managing the bus 802 and general processing, including the execution of software stored on the computer-readable storage medium 806. The software, when executed by the processor 804, causes the processing system 814 to perform the various functions described below for any particular apparatus. The computer-readable storage medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 806. Similar to computer-readable storage medium 806, computer-readable storage medium 806 may be a non-transitory computer-readable storage medium comprising characteristics that are substantially similar. The computer-readable storage medium 806 may reside in the processing system 814, external to the processing system 814, or distributed across multiple entities including the processing system 814. It should also be appreciated that, similar to computer-readable storage medium 806, computer-readable storage medium 806 may be embodied in a computer program product comprising characteristics that are substantially similar.

In some aspects of the disclosure, the processor 804 may include circuitry configured for various functions. For example, the processor 804 may include an initial sidelink circuitry 840 configured for various functions, including, for example, to transmit an initial sidelink communication according to an initial precoder in which the initial sidelink communication includes an initial sidelink control information (SCI) transmission and a corresponding initial sidelink data transmission, and the initial SCI transmission includes an indication of resources reserved for a subsequent sidelink communication. As illustrated, the processor 804 may also include a restricting circuitry 842 configured for various functions. For instance, the restricting circuitry 842 may be configured to apply a transmission restriction for the subsequent sidelink communication in which the subsequent sidelink communication includes a subsequent SCI transmission and a corresponding subsequent sidelink data transmission, and the transmission restriction is based on a transmission characteristic associated with the transmitting of the initial sidelink communication. The processor 804 may further include a subsequent sidelink circuitry 844 configured for various functions, including, for example, to transmit the subsequent sidelink communication according to the transmission restriction. It should also be appreciated that, the combination of the initial sidelink circuitry 840, the restricting circuitry 842, and the subsequent sidelink circuitry 844 may be configured to implement one or more of the functions described herein.

Various other aspects for wireless communication device 800 are also contemplated. For instance, it is contemplated that the applying the transmission restriction may include restricting selection of a subsequent precoder for precoding the subsequent sidelink communication. For example, the restricting may include using a same precoder for the initial precoder for precoding the initial sidelink communication and the subsequent precoder. It is also contemplated that the initial SCI transmission may further include an indication of resources reserved for an additional subsequent sidelink communication, where the additional subsequent sidelink communication is transmitted using the same precoder. In an example, the initial precoder includes an initial control precoder for precoding a control portion of the initial sidelink communication and an initial data precoder for precoding a data portion of the initial sidelink communication, and the subsequent precoder includes a subsequent control precoder for precoding a control portion of the subsequent sidelink communication and a subsequent data precoder for precoding a data portion of the subsequent sidelink communication, where the restricting may include using a same control precoder for the initial control precoder and the subsequent control precoder and/or using a same data precoder for the initial data precoder is same as the subsequent data precoder.

In another aspect disclosed herein, it is contemplated that the applying the transmission restriction may include using a same reference signal port to transmit each of the initial sidelink communication and the subsequent sidelink communication. Within such example, the initial SCI transmission may further include an indication of resources reserved for an additional subsequent sidelink communication, where the additional subsequent sidelink communication is transmitted using the same reference signal port.

In yet another aspect disclosed herein, it is contemplated that the applying the transmission restriction may include quasi co-locating reference signal ports used to transmit each of the initial sidelink communication and the subsequent sidelink communication. For instance, unless pre-configured otherwise, each of wireless communication device 800 and corresponding sensing UE may be configured to assume a quasi co-location (QCL) of the DMRS ports based on at least one of an average gain, a Type A QCL (e.g., a QCL based on Doppler shift, Doppler spread, average delay, and/or delay spread), a Type D QCL (e.g., a QCL based on a spatial Rx parameter), and/or a spatial domain transmission filter.

It should also be appreciated that wireless communication device 800 may be configured so as to ensure that restrictions on subsequent sidelink communications are placed on either pairs of sidelink control transmissions or pairs of sidelink data transmissions, but not pairs that include one of each. For instance, the transmitting of the subsequent sidelink communication may comprise applying the transmission restriction to each of the initial SCI transmission and the subsequent SCI transmission, where a sensing UE senses the wireless communication device 800 based on RSRP measurements performed on the PSCCH for each of the subsequent sidelink communications. Similarly, the transmitting of the subsequent sidelink communication may comprise applying the transmission restriction to each of the initial sidelink data transmission and the subsequent sidelink data transmission, where a sensing UE senses the wireless communication device 800 based on RSRP measurements performed on the PSSCH for each of the subsequent sidelink communications.

In an aspect disclosed herein, the transmission restriction may be applied according to a pre-configuration. For example, the pre-configuration may include an indication to enable or disable the transmission restriction and/or an indication to select the transmission restriction from a plurality of transmission restrictions.

In one or more examples, the computer-readable storage medium 806 may include initial sidelink software 852 configured for various functions, including, for example, to transmit an initial sidelink communication according to an initial precoder in which the initial sidelink communication includes an initial SCI transmission and a corresponding initial sidelink data transmission, and where the initial SCI transmission includes an indication of resources reserved for a subsequent sidelink communication. As illustrated, the computer-readable storage medium 806 may also include restricting software 854 configured for various functions. For instance, the restricting software 854 may be configured to apply a transmission restriction for the subsequent sidelink communication in which the subsequent sidelink communication includes a subsequent SCI transmission and a corresponding subsequent sidelink data transmission, and where the transmission restriction is based on a transmission characteristic associated with the transmitting of the initial sidelink communication. The computer-readable storage medium 806 may further include subsequent sidelink software 856 configured for various functions, including, for example, to transmit the subsequent sidelink communication according to the transmission restriction. It should also be appreciated that, the combination of the initial sidelink software 852, the restricting software 854, and the subsequent sidelink software 856 may be configured to implement one or more of the functions described herein.

In a particular configuration, it is also contemplated that the wireless communication device 800 includes means for transmitting an initial sidelink communication; means for applying a transmission restriction for a subsequent sidelink communication; and means for transmitting the subsequent sidelink communication. In one aspect, the aforementioned means may be the processor(s) 804 configured to perform the functions recited by the aforementioned means. In another aspect, the aforementioned means may be a circuit or any apparatus configured to perform the functions recited by the aforementioned means.

Figure 9:
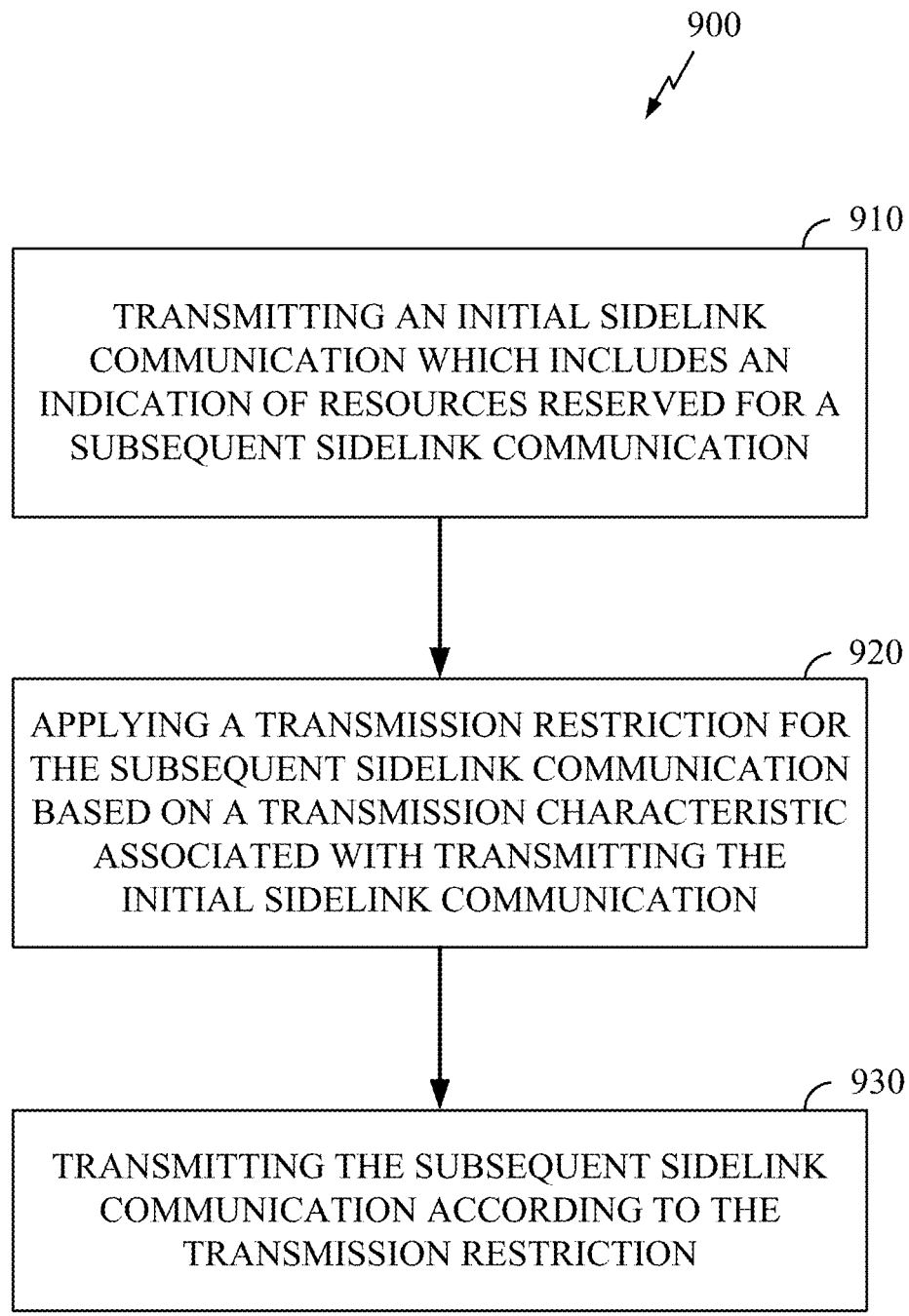
FIG. 9 is a flow chart illustrating an exemplary wireless communication device process that facilitates some aspects.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described herein, and utilizing, for example, the processes and/or algorithms described in relation to FIG. 9.

In FIG. 9, a flow chart is provided, which illustrates an exemplary wireless communication device process for performing some aspects of the disclosure. As described below, some or all illustrated features may be omitted in a particular implementation within the scope of the present disclosure, and some illustrated features may not be required for implementation of all examples. In some examples, the process 900 may be carried out by the wireless communication device 800 illustrated in FIG. 8. In some examples, the process 900 may be carried out by any suitable apparatus or means for carrying out the functions or algorithm described below.

Process 900 begins at block 910 with the wireless communication device 800 transmitting an initial sidelink communication, where an initial SCI transmission includes an indication of resources reserved for a subsequent sidelink communication. For example, the initial sidelink circuitry 840 shown and described above in connection with FIG. 8 may provide a means for transmitting the initial sidelink communication.

At block 920, process 900 continues with the wireless communication device 800 applying a transmission restriction for the subsequent sidelink communication, where the transmission restriction is based on a transmission characteristic associated with transmitting the initial sidelink communication. For example, the restricting circuitry 842 shown and described above in connection with FIG. 8 may provide a means for applying the transmission restriction.

In an aspect, the applying the transmission restriction at block 920 may include restricting selection of a subsequent precoder for precoding the subsequent sidelink communication. In an aspect, the restricting may include using a same precoder for an initial precoder for precoding the initial sidelink communication and the subsequent precoder. In an aspect, the initial SCI transmission may further include an indication of resources reserved for an additional subsequent sidelink communication, and where the additional subsequent sidelink communication is transmitted using the same precoder.

In an aspect, the initial precoder may include an initial control precoder for precoding a control portion of the initial sidelink communication and an initial data precoder for precoding a data portion of the initial sidelink communication, and the subsequent precoder includes a subsequent control precoder for precoding a control portion of the subsequent sidelink communication and a subsequent data precoder for precoding a data portion of the subsequent sidelink communication. In this aspect, the restricting may include at least one of: using a same control precoder for the initial control precoder and the subsequent control precoder, or using a same data precoder for the initial data precoder is same as the subsequent data precoder.

In an aspect, the applying the transmission restriction at block 920 may include using a same reference signal port to transmit each of the initial sidelink communication and the subsequent sidelink communication. In an aspect, the initial SCI transmission may further include an indication of resources reserved for an additional subsequent sidelink communication, where the additional subsequent sidelink communication may be transmitted using the same reference signal port.

In an aspect, the applying the transmission restriction at block 920 may include quasi co-locating reference signal ports used to transmit each of the initial sidelink communication and the subsequent sidelink communication. In an aspect, the reference signal ports may be quasi co-located based on at least one of average gain, a Type A quasi co-location, a Type D quasi co-location, and/or a spatial domain transmission filter.

In an aspect, the transmission restriction may be applied at 920 according to a pre-configuration. In an aspect, the pre-configuration may include at least one of: an indication to enable or disable the transmission restriction, or an indication to select the transmission restriction from a plurality of transmission restrictions.

Process 900 then concludes block 930 where the wireless communication device 800 transmits the subsequent sidelink communication according to the transmission restriction. For example, the subsequent sidelink circuitry 844 shown and described above in connection with FIG. 8 may provide a means for transmitting the subsequent sidelink communication. In an aspect, the transmitting of the subsequent sidelink communication at block 930 may include applying the transmission restriction to each of the initial SCI transmission and a subsequent SCI transmission.

In one configuration, the wireless communication device 800 for wireless communication includes means for transmitting an initial sidelink communication, where an initial SCI transmission includes an indication of resources reserved for a subsequent sidelink communication, means for applying a transmission restriction for the subsequent sidelink communication, where the transmission restriction is based on a transmission characteristic associated with transmitting the initial sidelink communication, and means for transmitting the subsequent sidelink communication according to the transmission restriction. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Figure 10:
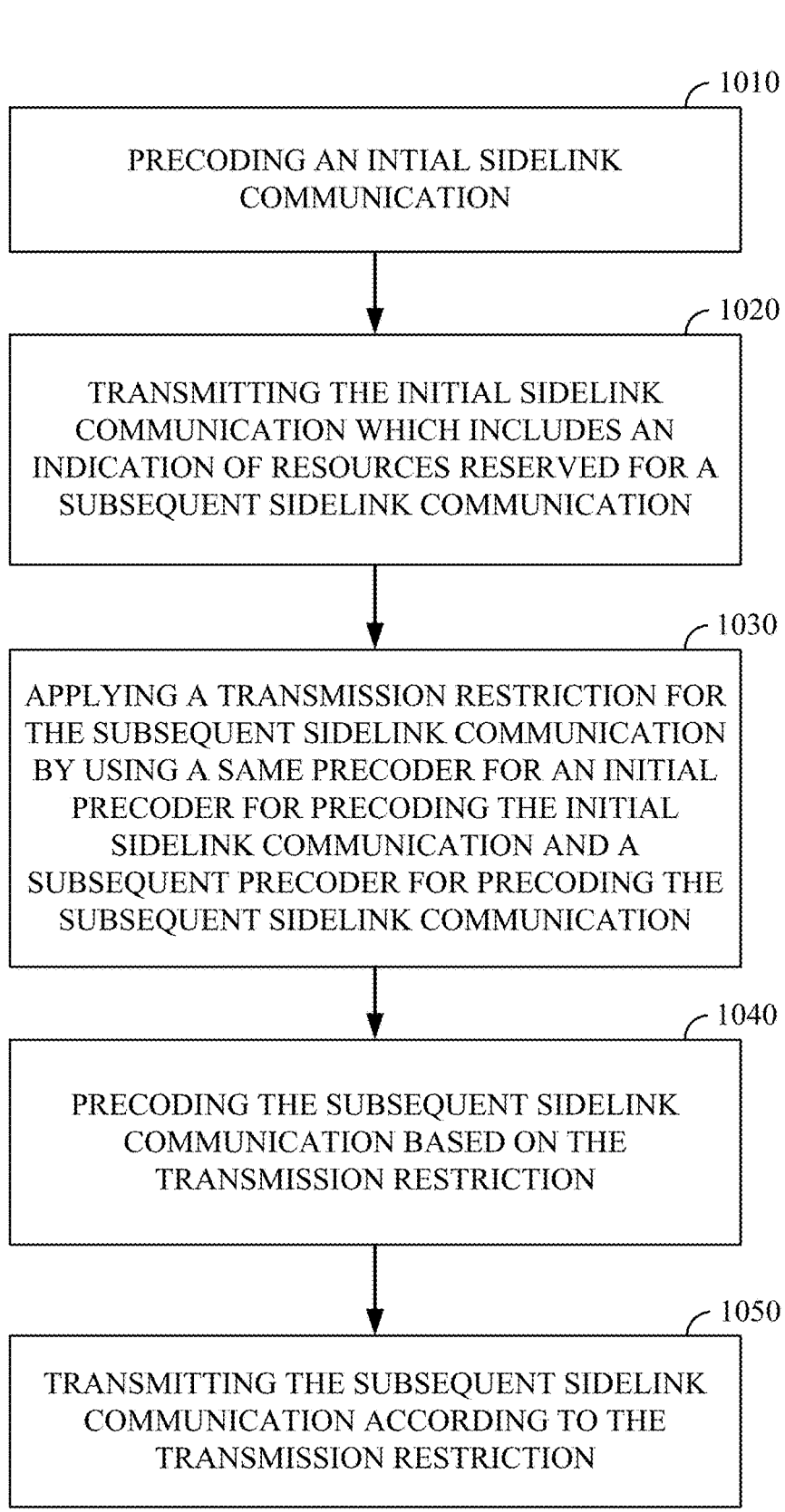
FIG. 10 is a flow chart illustrating an exemplary wireless communication device process that facilitates some aspects.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-4 and 7, and utilizing, for example, the processes and/or algorithms described herein in relation to FIGS. 9, 10, and/or 11.

In FIG. 10, a flow chart is provided, which illustrates an exemplary wireless communication device process for performing some aspects of the disclosure. As described below, some or all illustrated features may be omitted in a particular implementation within the scope of the present disclosure, and some illustrated features may not be required for implementation of all examples. In some examples, the process 1000 may be carried out by the wireless communication device 800 illustrated in FIG. 8. In some examples, the process 1000 may be carried out by any suitable apparatus or means for carrying out the functions or algorithm described below.

Process 1000 begins at block 1010 with the wireless communication device 800 precoding an initial sidelink communication. For example, the initial sidelink circuitry 840 shown and described above in connection with FIG. 8 may provide a means for precoding the initial sidelink communication.

At block 1020, process 1000 continues with the wireless communication device 800 transmitting an initial sidelink communication, where an initial SCI transmission includes an indication of resources reserved for a subsequent sidelink communication. For example, the initial sidelink circuitry 840 shown and described above in connection with FIG. 8 may provide a means for transmitting the initial sidelink communication.

At block 1030, process 1000 further continues with the wireless communication device 800 applying a transmission restriction for the subsequent sidelink communication by using a same precoder for an initial precoder for precoding the initial sidelink communication and a subsequent precoder for precoding the subsequent sidelink communication. For example, the restricting circuitry 842 shown and described above in connection with FIG. 8 may provide a means for applying the transmission restriction.

At block 1040, process 1000 further continues with the wireless communication device 800 precoding the subsequent sidelink communication based on the transmission restriction. For example, the subsequent sidelink circuitry 844 shown and described above in connection with FIG. 8 may provide a means for precoding the subsequent sidelink communication.

Process 1000 then concludes block 1050 where the wireless communication device 800 transmits the subsequent sidelink communication according to the transmission restriction. For example, the subsequent sidelink circuitry 844 shown and described above in connection with FIG. 8 may provide a means for transmitting the subsequent sidelink communication.

In one configuration, the wireless communication device 800 for wireless communication includes means for precoding an initial sidelink communication, means for transmitting the initial sidelink communication, where an initial sidelink control information (SCI) transmission includes an indication of resources reserved for a subsequent sidelink communication, means for applying a transmission restriction for the subsequent sidelink communication using a same precoder for an initial precoder for precoding the initial sidelink communication and a subsequent precoder for precoding the subsequent sidelink communication, means for precoding the subsequent sidelink communication based on the transmission restriction, and means for transmitting the subsequent sidelink communication according to the transmission restriction. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-4 and 7, and utilizing, for example, the processes and/or algorithms described herein in relation to FIGS. 9, 10, and/or 11.

Figure 11:
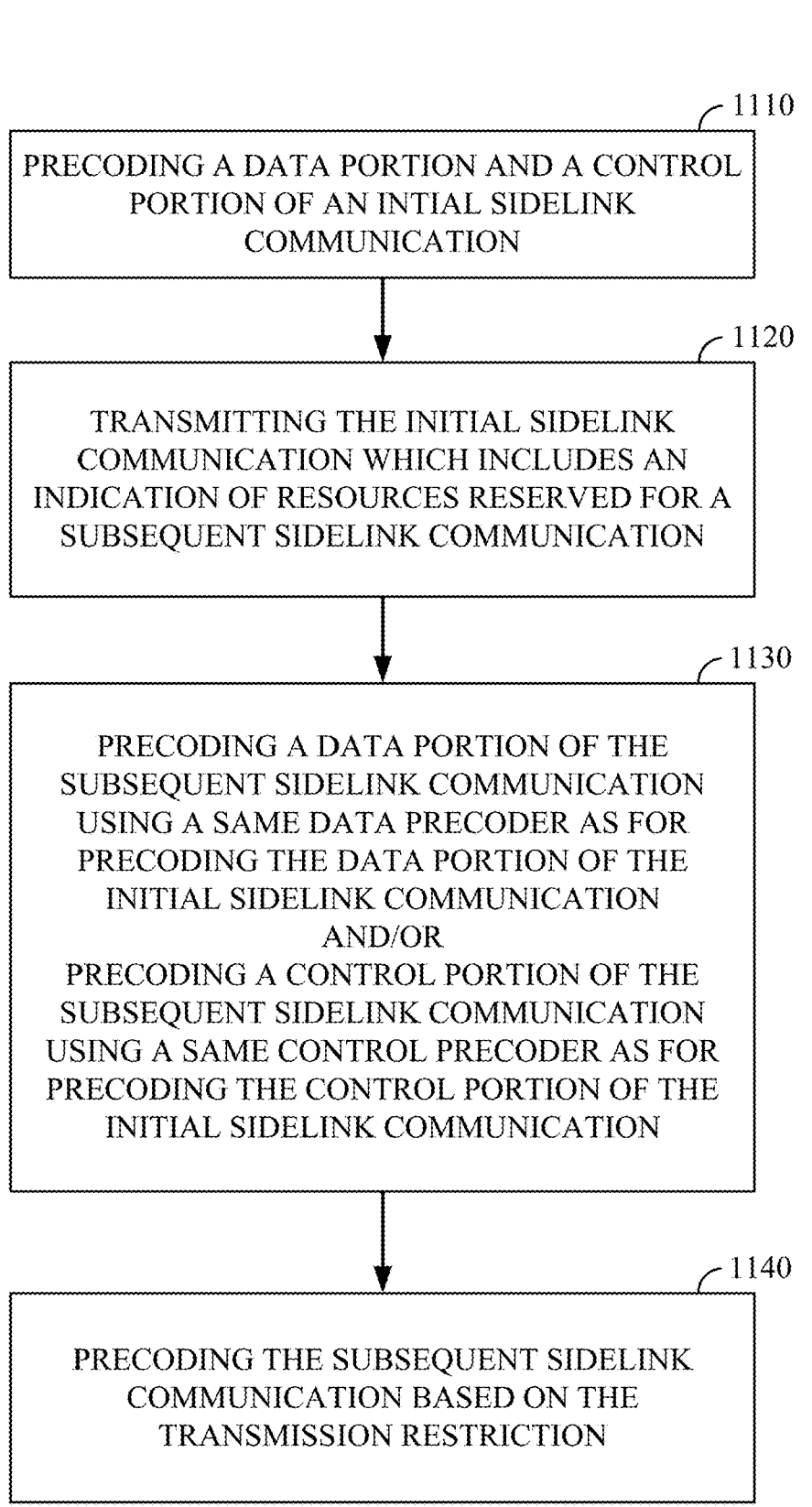
FIG. 11 is a flow chart illustrating an exemplary wireless communication device process that facilitates some aspects.

In FIG. 11, a flow chart is provided, which illustrates an exemplary wireless communication device process for performing some aspects of the disclosure. As described below, some or all illustrated features may be omitted in a particular implementation within the scope of the present disclosure, and some illustrated features may not be required for implementation of all examples. In some examples, the process 1100 may be carried out by the wireless communication device 800 illustrated in FIG. 8. In some examples, the process 1100 may be carried out by any suitable apparatus or means for carrying out the functions or algorithm described below.

Process 1100 begins at block 1110 with the wireless communication device 800 precoding a data portion and a control portion an initial sidelink communication. For example, the initial sidelink circuitry 840 shown and described above in connection with FIG. 8 may provide a means for precoding the data portion and the control portion of the initial sidelink communication.

At block 1120, process 1100 continues with the wireless communication device 800 transmitting an initial sidelink communication, where an initial SCI transmission includes an indication of resources reserved for a subsequent sidelink communication. For example, the initial sidelink circuitry 840 shown and described above in connection with FIG. 8 may provide a means for transmitting the initial sidelink communication.

At block 1130, process 1100 further continues with the wireless communication device 800 precoding a data portion of the subsequent sidelink communication using a same data precoder as for precoding the data portion of the initial sidelink communication and/or precoding a control portion of the subsequent sidelink communication using a same control precoder as for precoding the control portion of the initial sidelink communication. For example, the restricting circuitry 842 shown and described above in connection with FIG. 8 may provide a means for precoding the data portion and/or the control portion of the subsequent sidelink communication.

Process 1100 then concludes block 1140 where the wireless communication device 800 transmits the subsequent sidelink communication according to the transmission restriction. For example, the subsequent sidelink circuitry 844 shown and described above in connection with FIG. 8 may provide a means for transmitting the subsequent sidelink communication.

In one configuration, the wireless communication device 800 for wireless communication includes means for precoding a data portion and a control portion of an initial sidelink communication, means for transmitting the initial sidelink communication, where an initial SCI transmission includes an indication of resources reserved for a subsequent sidelink communication, means for precoding a data portion of the subsequent sidelink communication using a same data precoder as for precoding the data portion of the initial sidelink communication and/or precoding a control portion of the subsequent sidelink communication using a same control precoder as for precoding the control portion of the initial sidelink communication, and means for transmitting the subsequent sidelink communication according to the transmission restriction. In one aspect, the aforementioned means may be the processor(s) 804 shown in FIG. 8 configured to perform the functions recited by the aforementioned means. In another aspect, the aforementioned means may be a circuit or any apparatus configured to perform the functions recited by the aforementioned means.

Of course, in the above examples, the circuitry included in the processor 804 is merely provided as an example, and other means for carrying out the described functions may be included within various aspects of the present disclosure, including but not limited to the instructions stored in the computer-readable storage medium 806, or any other suitable apparatus or means described in any one of the FIGS. 1-4 and 7, and utilizing, for example, the processes and/or algorithms described herein in relation to FIGS. 9, 10, and/or 11.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-11 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-8 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, where reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   transmitting an initial sidelink communication, wherein an initial sidelink control information (SCI) transmission in the initial sidelink communication includes an indication of resources reserved for a subsequent sidelink communication;
   applying a transmission restriction for the subsequent sidelink communication, wherein the transmission restriction is based on a transmission characteristic associated with the transmitting of the initial sidelink communication; and
   transmitting the subsequent sidelink communication including a subsequent SCI transmission according to the transmission restriction,
   wherein the applying the transmission restriction comprises restricting selection of a subsequent precoder for precoding the subsequent sidelink communication based on an initial precoder for precoding the initial sidelink communication.

2. The method of claim 1, wherein the restricting comprises using a same precoder for the initial precoder for precoding the initial sidelink communication and the subsequent precoder.

3. The method of claim 2, wherein the initial SCI transmission further includes an indication of resources reserved for an additional subsequent sidelink communication, and wherein the additional subsequent sidelink communication is transmitted using the same precoder.

4. The method of claim 1, wherein an initial precoder for precoding the initial sidelink communication includes an initial control precoder for precoding a control portion of the initial sidelink communication and an initial data precoder for precoding a data portion of the initial sidelink communication, and the subsequent precoder includes a subsequent control precoder for precoding a control portion of the subsequent sidelink communication and a subsequent data precoder for precoding a data portion of the subsequent sidelink communication, and
    wherein the restricting comprises at least one of:
        using a same control precoder for the initial control precoder and the subsequent control precoder, or
        using a same data precoder for the initial data precoder and the subsequent data precoder.

5. The method of claim 1, wherein the applying the transmission restriction further comprises using a same reference signal port to transmit each of the initial sidelink communication and the subsequent sidelink communication.

6. The method of claim 5, wherein the initial SCI transmission further includes an indication of resources reserved for an additional subsequent sidelink communication, and wherein the additional subsequent sidelink communication is transmitted using the same reference signal port.

7. The method of claim 1, wherein the applying the transmission restriction further comprises quasi co-locating reference signal ports used to transmit each of the initial sidelink communication and the subsequent sidelink communication.

8. The method of claim 7, wherein the reference signal ports are quasi co-located based on at least one of average gain, a Type A quasi co-location, a Type D quasi co-location, or a spatial domain transmission filter.

9. The method of claim 1, wherein the transmitting of the subsequent sidelink communication comprises applying the transmission restriction to each of the initial SCI transmission and the subsequent SCI transmission.

10. The method of claim 1, wherein the transmitting of the subsequent sidelink communication comprises applying the transmission restriction to each of an initial sidelink data transmission and a subsequent sidelink data transmission.

11. The method of claim 1, wherein the transmission restriction is applied according to a pre-configuration.

12. The method of claim 11, wherein the pre-configuration includes at least one of:
    an indication to enable or disable the transmission restriction, or
    an indication to select the transmission restriction from a plurality of transmission restrictions.

13. A wireless communication device comprising:
    a transceiver;
    a memory; and
    at least one processor coupled to the transceiver and the memory, wherein the at least one processor and the memory are configured to:
        transmit an initial sidelink communication, wherein an initial sidelink control information (SCI) transmission in the initial sidelink communication includes an indication of resources reserved for a subsequent sidelink communication;
        apply a transmission restriction for the subsequent sidelink communication including a subsequent SCI transmission, wherein the transmission restriction is based on a transmission characteristic associated with transmitting the initial sidelink communication; and
        transmit the subsequent sidelink communication according to the transmission restriction,
        wherein the at least one processor and the memory configured to apply the transmission restriction are further configured to restrict selection of a subsequent precoder for precoding the subsequent sidelink communication based on an initial precoder for precoding the initial sidelink communication.

14. The wireless communication device of claim 13, wherein the at least one processor and the memory are further configured to use a same precoder for an initial precoder for precoding the initial sidelink communication and the subsequent precoder.

15. The wireless communication device of claim 14, wherein the initial SCI transmission further includes an indication of resources reserved for an additional subsequent sidelink communication, and wherein the additional subsequent sidelink communication is transmitted using the same precoder.

16. The wireless communication device of claim 13, wherein an initial precoder for precoding the initial sidelink communication includes an initial control precoder for precoding a control portion of the initial sidelink communication and an initial data precoder for precoding a data portion of the initial sidelink communication, and the subsequent precoder includes a subsequent control precoder for precoding a control portion of the subsequent sidelink communication and a subsequent data precoder for precoding a data portion of the subsequent sidelink communication, and
    wherein the at least one processor and the memory are further configured to perform at least one of:
        use a same control precoder for the initial control precoder and the subsequent control precoder, or
        use a same data precoder for the initial data precoder and the subsequent data precoder.

17. The wireless communication device of claim 13, wherein the at least one processor configured to apply the transmission restriction is further configured to use a same reference signal port to transmit each of the initial sidelink communication and the subsequent sidelink communication.

18. The wireless communication device of claim 17, wherein the initial SCI transmission further includes an indication of resources reserved for an additional subsequent sidelink communication, and wherein the additional subsequent sidelink communication is transmitted using the same reference signal port.

19. The wireless communication device of claim 13, wherein the at least one processor and the memory configured to apply the transmission restriction is further configured to quasi co-locate reference signal ports used to transmit each of the initial sidelink communication and the subsequent sidelink communication.

20. The wireless communication device of claim 19, wherein the reference signal ports are quasi co-located based on at least one of average gain, a Type A quasi co-location, a Type D quasi co-location, and/or a spatial domain transmission filter.

21. The wireless communication device of claim 13, wherein the at least one processor and the memory configured to transmit the subsequent sidelink communication are further configured to apply the transmission restriction to each of the initial SCI transmission and the subsequent SCI transmission.

22. The wireless communication device of claim 13, wherein the at least one processor and the memory configured to transmit the subsequent sidelink communication are further configured to apply the transmission restriction to each of an initial sidelink data transmission and a subsequent sidelink data transmission.

23. The wireless communication device of claim 13, wherein the transmission restriction is applied according to a pre-configuration.

24. The wireless communication device of claim 23, wherein the pre-configuration includes at least one of:
- an indication to enable or disable the transmission restriction, or
- an indication to select the transmission restriction from a plurality of transmission restrictions.

25. A wireless communication device for wireless communication comprising:
- means for transmitting an initial sidelink communication, wherein an initial sidelink control information (SCI) transmission in the initial sidelink communication includes an indication of resources reserved for a subsequent sidelink communication;
- means for applying a transmission restriction for the subsequent sidelink communication including a subsequent SCI transmission, wherein the transmission restriction is based on a transmission characteristic associated with transmitting the initial sidelink communication; and
- means for transmitting the subsequent sidelink communication according to the transmission restriction,
- wherein the means for applying the transmission restriction is further configured to restrict selection of a subsequent precoder for precoding the subsequent sidelink communication based on an initial precoder for precoding the initial sidelink communication.

26. The wireless communication device of claim 25, wherein the means for applying the transmission restriction is further configured to use a same precoder for an initial precoder for precoding the initial sidelink communication and the subsequent precoder.

27. The wireless communication device of claim 26, wherein the initial SCI transmission further includes an indication of resources reserved for an additional subsequent sidelink communication, and wherein the additional subsequent sidelink communication is transmitted using the same precoder.

28. The wireless communication device of claim 25, wherein an initial precoder for precoding the initial sidelink communication includes an initial control precoder for precoding a control portion of the initial sidelink communication and an initial data precoder for precoding a data portion of the initial sidelink communication, and the subsequent precoder includes a subsequent control precoder for precoding a control portion of the subsequent sidelink communication and a subsequent data precoder for precoding a data portion of the subsequent sidelink communication, and
- wherein the means for applying the transmission restriction is further configured to perform at least one of:
  - use a same control precoder for the initial control precoder and the subsequent control precoder, or
  - use a same data precoder for the initial data precoder and the subsequent data precoder.

29. The wireless communication device of claim 25, wherein the means for applying the transmission restriction is further configured to use a same reference signal port to transmit each of the initial sidelink communication and the subsequent sidelink communication.

30. The wireless communication device of claim 29, wherein the initial SCI transmission further includes an indication of resources reserved for an additional subsequent sidelink communication, and wherein the additional subsequent sidelink communication is transmitted using the same reference signal port.

31. The wireless communication device of claim 25, wherein the means for applying the transmission restriction is further configured to quasi co-locate reference signal ports used to transmit each of the initial sidelink communication and the subsequent sidelink communication.

32. The wireless communication device of claim 31, wherein the reference signal ports are quasi co-located based on at least one of average gain, a Type A quasi co-location, a Type D quasi co-location, and/or a spatial domain transmission filter.

33. The wireless communication device of claim 25, wherein the means for transmitting the subsequent sidelink communication is further configured to apply the transmission restriction to each of the initial SCI transmission and the subsequent SCI transmission.

34. The wireless communication device of claim 25, wherein the means for transmitting the subsequent sidelink communication is further configured to apply the transmission restriction to each of an initial sidelink data transmission and a subsequent sidelink data transmission.

35. The wireless communication device of claim 25, wherein the transmission restriction is applied according to a pre-configuration.

36. The wireless communication device of claim 35, wherein the pre-configuration includes at least one of:
- an indication to enable or disable the transmission restriction, or
- an indication to select the transmission restriction from a plurality of transmission restrictions.

37. A non-transitory computer-readable storage medium having instructions for a wireless communication device thereon, wherein the instructions, when executed by a processing circuit, cause the processing circuit to:
- transmit an initial sidelink communication, wherein an initial sidelink control information (SCI) transmission in the initial sidelink communication includes an indication of resources reserved for a subsequent sidelink communication;
- apply a transmission restriction for the subsequent sidelink communication including a subsequent SCI transmission, wherein the transmission restriction is based on a transmission characteristic associated with transmitting the initial sidelink communication; and
- transmit the subsequent sidelink communication according to the transmission restriction,
- wherein the instructions causing the processing circuit to applying the transmission restrictions are configured to restrict selection of a subsequent precoder for precoding the subsequent sidelink communication based on an initial precoder for precoding the initial sidelink communication.

* * * * *